United States Patent
Masuyama et al.

[11] Patent Number: 5,392,873
[45] Date of Patent: Feb. 28, 1995

[54] STRUCTURE FOR SECURING BATTERIES USED IN AN ELECTRIC VEHICLE

[75] Inventors: Toshio Masuyama; Masami Suzuki; Hiroyuki Fujimoto, all of Wako, Japan

[73] Assignee: Honda Giken Kogyo Kabushiki Kaisha, Tokyo, Japan

[21] Appl. No.: 7,176

[22] Filed: Jan. 21, 1993

[30] Foreign Application Priority Data

Jan. 22, 1992 [JP] Japan ................................. 4-009516
Jan. 23, 1992 [JP] Japan ................................. 4-009678

[51] Int. Cl.⁶ ............................................. B60R 16/04
[52] U.S. Cl. ................................ 180/68.5; 429/120; 429/148; 429/99
[58] Field of Search .................. 180/68.5; 429/62, 82, 429/120, 148, 99, 159, 247, 254, 151, 129, 154, 155

[56] References Cited

U.S. PATENT DOCUMENTS

| | | | |
|---|---|---|---|
| 645,640 | 3/1900 | Chamberlain | 429/148 X |
| 729,550 | 6/1903 | Condict | 429/148 |
| 754,858 | 3/1904 | Edison | 429/148 X |
| 3,933,522 | 1/1976 | Steig | 429/148 X |
| 4,078,893 | 3/1978 | Gilman et al. | 429/57 X |
| 4,135,593 | 1/1979 | Fowkes | 180/68.5 X |
| 4,169,918 | 10/1979 | Moore | 429/120 X |
| 4,216,839 | 8/1980 | Gould et al. | 180/68.5 X |
| 4,267,895 | 5/1981 | Eggert, Jr. | 180/68.5 X |
| 4,339,015 | 7/1982 | Fowkes et al. | 180/68.5 X |
| 4,365,681 | 12/1982 | Singh | 180/68.5 |
| 4,468,440 | 8/1984 | Evjen | 429/120 X |
| 4,522,898 | 6/1985 | Esrom | 429/120 |
| 4,957,829 | 9/1990 | Holl | 429/99 |
| 5,015,545 | 5/1991 | Brooks | 180/68.5 X |
| 5,039,927 | 8/1991 | Centafanti | 429/62 X |
| 5,156,225 | 10/1992 | Murrin | 180/68.5 X |

FOREIGN PATENT DOCUMENTS

| | | |
|---|---|---|
| 58-52615 | 11/1983 | Japan . |
| 0249661 | 4/1926 | United Kingdom ................. 429/148 |
| 1555773 | 11/1979 | United Kingdom . |

Primary Examiner—Richard M. Camby
Assistant Examiner—F. Zeender
Attorney, Agent, or Firm—Lyon & Lyon

[57] ABSTRACT

A structure for securing a plurality of batteries used for an electric vehicle. The battery securing structure includes an inner spacer member having a lower inner spacer member and an upper inner spacer member, each of which is made of a synthetic resin such as polypropylene (PP). The lower inner spacer member has partition portions divided into separate compartments to fixedly dispose each battery in a compartment whereby all the batteries are in a state in which they have been separated from each other on all sides. The upper inner spacer member includes pressing portions for pressing and holding desired portions of the batteries, concave portions for defining spaces used for conductive wires and cooling, and partition portions divided into compartments to unmovably dispose the batteries in a state in which they have been spaced away from each other. Thus, the plurality of batteries can be reliably and firmly secured and fixed within a battery box.

29 Claims, 16 Drawing Sheets

STRUCTURE FOR SECURING BATTERIES USED IN AN ELECTRIC VEHICLE

BACKGROUND OF THE INVENTION

1. Field of the Invention

The present invention relates to a structure for reliably securing a plurality of batteries used in an electric vehicle to fixed positions in the electric vehicle.

2. Description of the Related Art

As a power supply for driving an electric vehicle, one type of arrangement that has normally been used is wherein a plurality of batteries are electrically series-connected to one another. When a battery of 12 V is used, for example, it is necessary to electrically series-connect nine or more batteries to one another to produce the desired electric power and to mount the so-connected batteries in the electric vehicle. Therefore, a structure has been employed wherein the desired number of batteries are suspended from a frame member of the vehicle body, which is located under the floor, with the batteries being accommodated in a battery box (see GB 1555773 A). Each of the batteries referred to above is heavy and the combined weight as a unit is very substantial. Thus, this type of structure is employed to lower the center of gravity of the vehicle body by disposing the heavy batteries on the lower side of the vehicle body.

Since the respective batteries are so heavy, it is necessary to firmly mount the batteries in the battery box. Therefore, there is known a structure disclosed in Japanese Utility Model Application Publication No. 58-52615, for example, in which the entire upper surface of the batteries is pressed by rubber presser member to thereby fixedly mount the batteries in the case.

The above conventional arrangement involves problems in that the rubber presser member also should be provided between the respective adjacent batteries and a process for detachably mounting a plurality of pieces of rubber presser members is required when the number of the batteries increases, particularly for execution of a maintenance process such as replacement of each battery, thereby making this type of maintenance process complex.

Also, the conventional arrangement creates the problem that since a plurality of batteries are accommodated within the battery box, the temperature of the batteries tends to increase beyond an effective use temperature, thereby causing a reduction in performance of each battery and decreasing the cycle life of each battery. Further, when the temperature of each battery is too high during its charging, the efficiency of charging of each battery is reduced.

Moreover, since the battery box is placed under the floor, when an opening or aperture for introducing cooling air into the battery box is opened, water, mud, dust, etc. tend to enter into the battery box through the opening or aperture.

SUMMARY OF THE INVENTION

With the foregoing problems in view, it is therefore an object of the present invention to provide a structure for securing a plurality of batteries used in an electric vehicle, wherein the batteries can be reliably fixedly mounted in a battery box and a battery replacement process or the like can be efficiently affected..

According to one aspect of the present invention, for achieving the above object, there is provided a structure for securing a plurality of batteries for driving an electric vehicle in a state in which the plurality of batteries have been compactly disposed, comprising an inner spacer member for accommodating the plurality of batteries in a body of a battery box, the inner spacer member including partition members formed as an integral unit, for unmovably disposing the plurality of batteries spaced from one another.

In the above structure, the inner spacer member can be provided with a lower inner spacer member for placing the plurality of batteries thereon. The lower inner spacer member can include portions for defining spaces between the box body and the lower inner spacer member. The inner spacer member can be provided with an upper inner spacer member capable of pressing and holding the upper surface of the plurality or batteries. The upper inner spacer member can include concave portions for defining predetermined spaces between the upper surface of the plurality of batteries and the upper inner spacer member. The upper inner spacer member can be provided with a hydrogen sensor. Further, the inner spacer member can be made of a resinous material.

The above securing structure can include a thermal insulator which accommodates therein the plurality of batteries disposed in the inner spacer member and is held within the box body.

According to another aspect of the present invention, there is provided a structure for securing a plurality of batteries for driving an electric vehicle in a state in which the plurality of batteries have been compactly disposed, comprising a body of a battery box, for accommodating the plurality of batteries therein, an inner spacer member having a lower inner spacer member and an upper inner spacer member both of which include partition members for unmovably disposing the plurality of batteries in a state in which they have been separated from one another, and a cover for covering and holding the plurality of batteries supported by the inner spacer member integrally with the box body.

In the above structure, the box body and the cover can be made of metallic materials and the inner spacer member can be made of a resinous material.

The above battery securing structure can include an intake air passage member for introducing cooling air into the box body, which comprises a chamber in which the cooling air is taken, at least one first passage for temporarily introducing external cooling air into the lower side of the chamber from an upper position of the chamber, and a second passage provided on the upper side in the chamber and used to introduce the cooling air brought into the chamber into the box body.

The intake air passage member can be mounted to a front end of the box body, which extends in a vehicle running direction. Further, discharge holes for discharging the cooling air can be defined in both side walls of the box body, which are located on the rear side in the vehicle running direction. The intake air passage member can include an impact buffering bent portion provided at a lower end thereof.

Further, the above battery securing structure can include an intake air passage member for introducing cooling air into the box body. The intake air passage member can be opened within a front-side crossmember of a frame member of the vehicle body so as to introduce the cooling air into the box body from the front-side crossmember.

Furthermore, the above battery securing structure can also include at least one discharge air passage member for discharging the cooling air from the box body. The discharge air passage member can be opened within a rear-side crossmember of the frame member of the vehicle body so as to discharge the cooling air from the box body into the rear-side crossmember.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 15 is a plan view illustrating the manner of mounting of a thermal insulator and a lower inner spacer member in a box body employed in the third embodiment; and.

DETAILED DESCRIPTION OF THE PREFERRED EMBODIMENTS

A structure for fixing batteries used for an electric vehicle, according to the present invention will hereinafter be described with reference to the accompanying drawings in which preferred embodiments are shown by way of illustrative examples.

Figure 1:
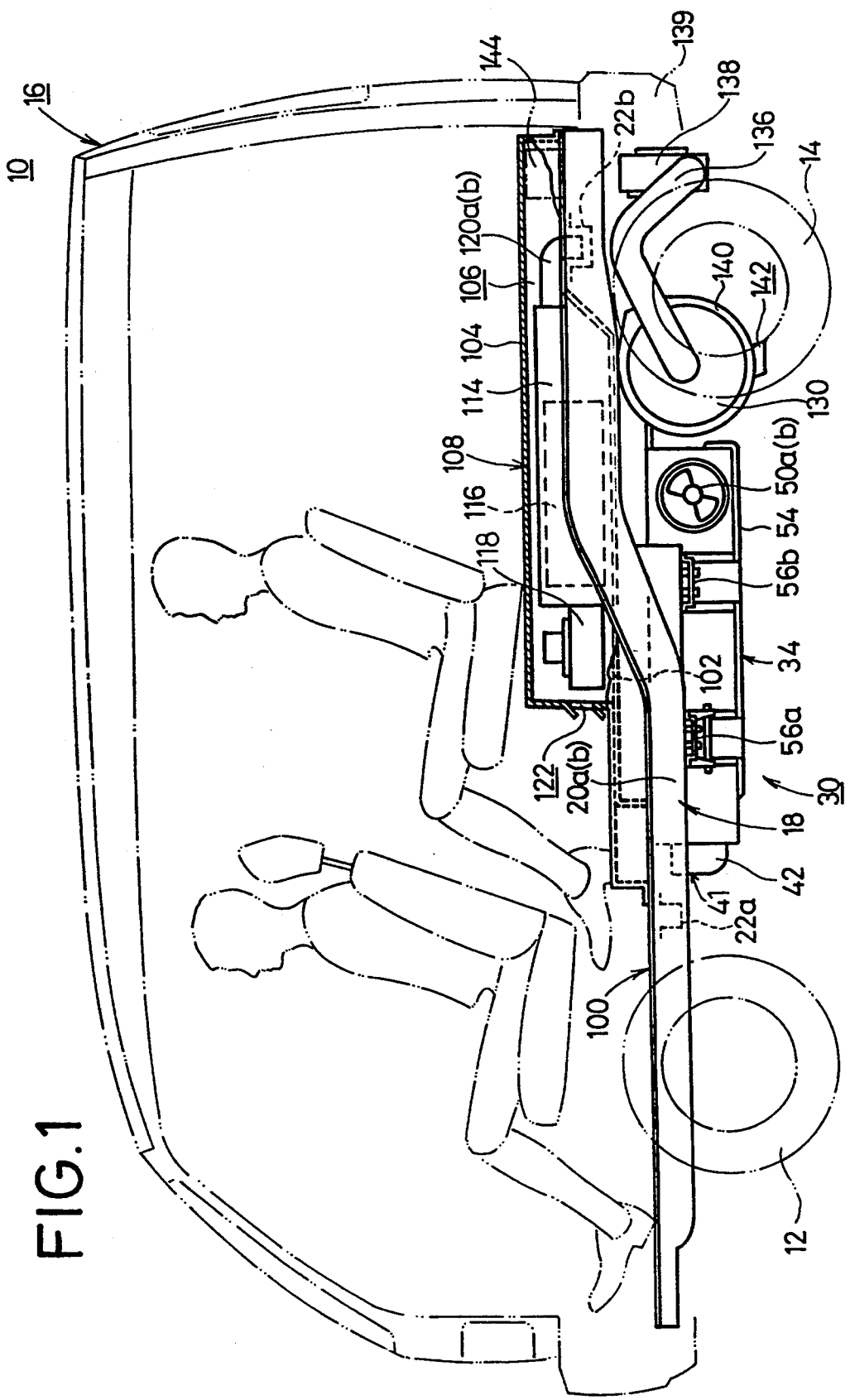
FIG. 1 is a side view schematically showing the construction of an electric vehicle having a battery securing structure according to a first embodiment of the present invention incorporated therein, in which an upper floor is partly cut away to illustrate a frame member.
Figure 2:
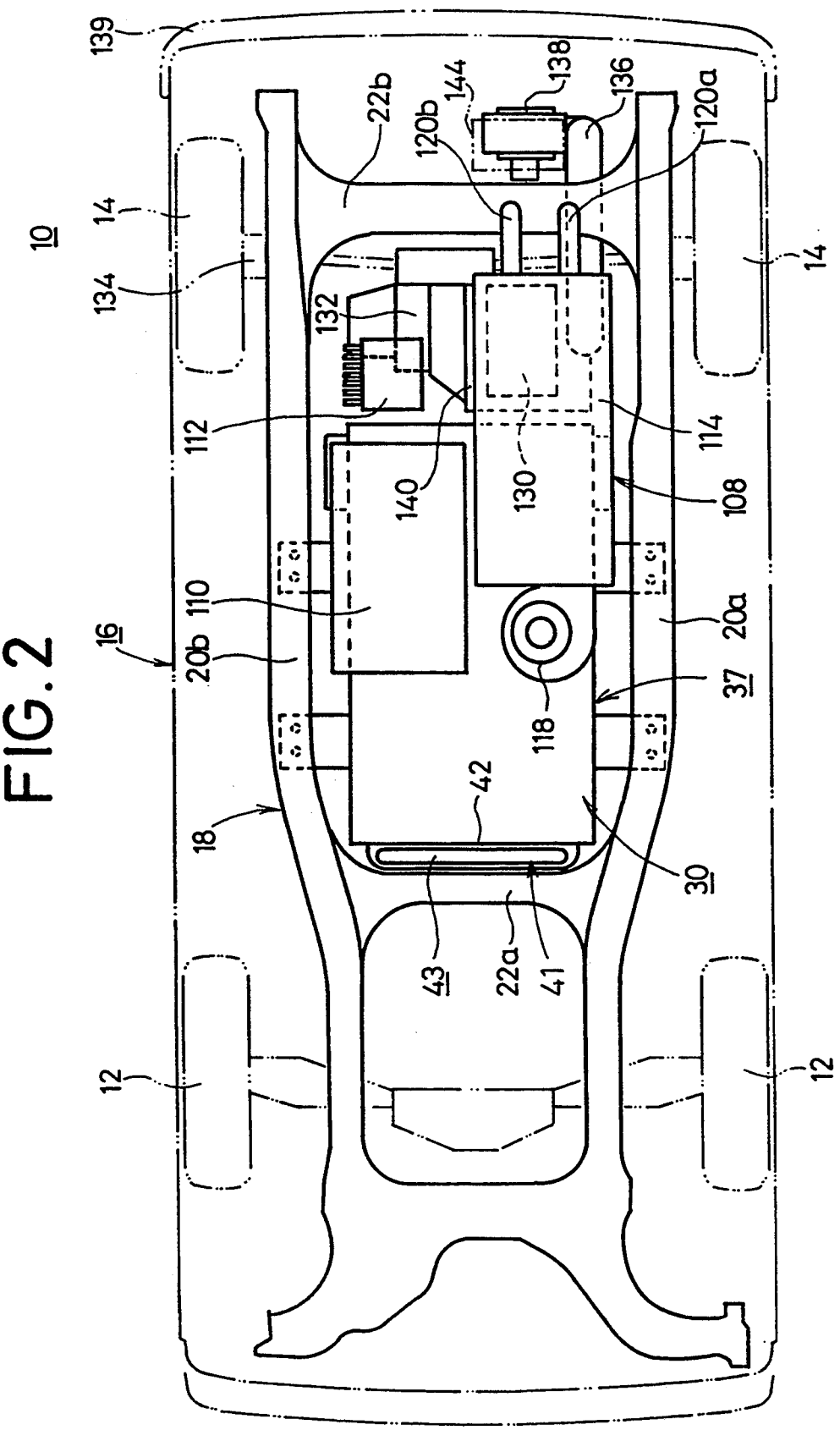
FIG. 2 is a schematic plan view illustrating the manner in which the components of the electric vehicle are arranged.

In FIGS. 1 and 2, reference numeral 10 indicates an electric vehicle in which a battery securing structure according to a first embodiment is incorporated. The electric vehicle 10 includes front wheels 12, rear wheels 14 and a vehicle body 16. A frame member 18 of the vehicle body 16 has an open area defined by a front-side crossmember 22a and a rear-side crossmember 22b both provided between sideframes 20a and 20b (see FIG. 2).

A battery box 30, which is provided between the front wheels 12 and the rear wheels 14, is held by the sideframes 20a, 20b in a suspended state. As shown in FIGS. 3 through 6, the battery box 30 has a box body 34 which accommodates nine batteries 32a through 32i for driving the electric vehicle 10 and is mounted to the electric vehicle 10. The box body 34 is provided with a reinforcement portion or member 36 for supporting at least respective portions of each of the batteries 32a through 32i in the box body 34. Each of the batteries 32a through 32i comprises 10 cells which are electrically series-connected to one another so as to provide a voltage of 12 V. The nine batteries 32a through 32i are series-connected and actually output a voltage of 108 V.

The battery securing structure 37 according to the first embodiment comprises the box body 34, an inner spacer member 33 and a cover 35. Each of the box body 34 and the cover 35 is made of a hard material such as steel.

Figure 5:
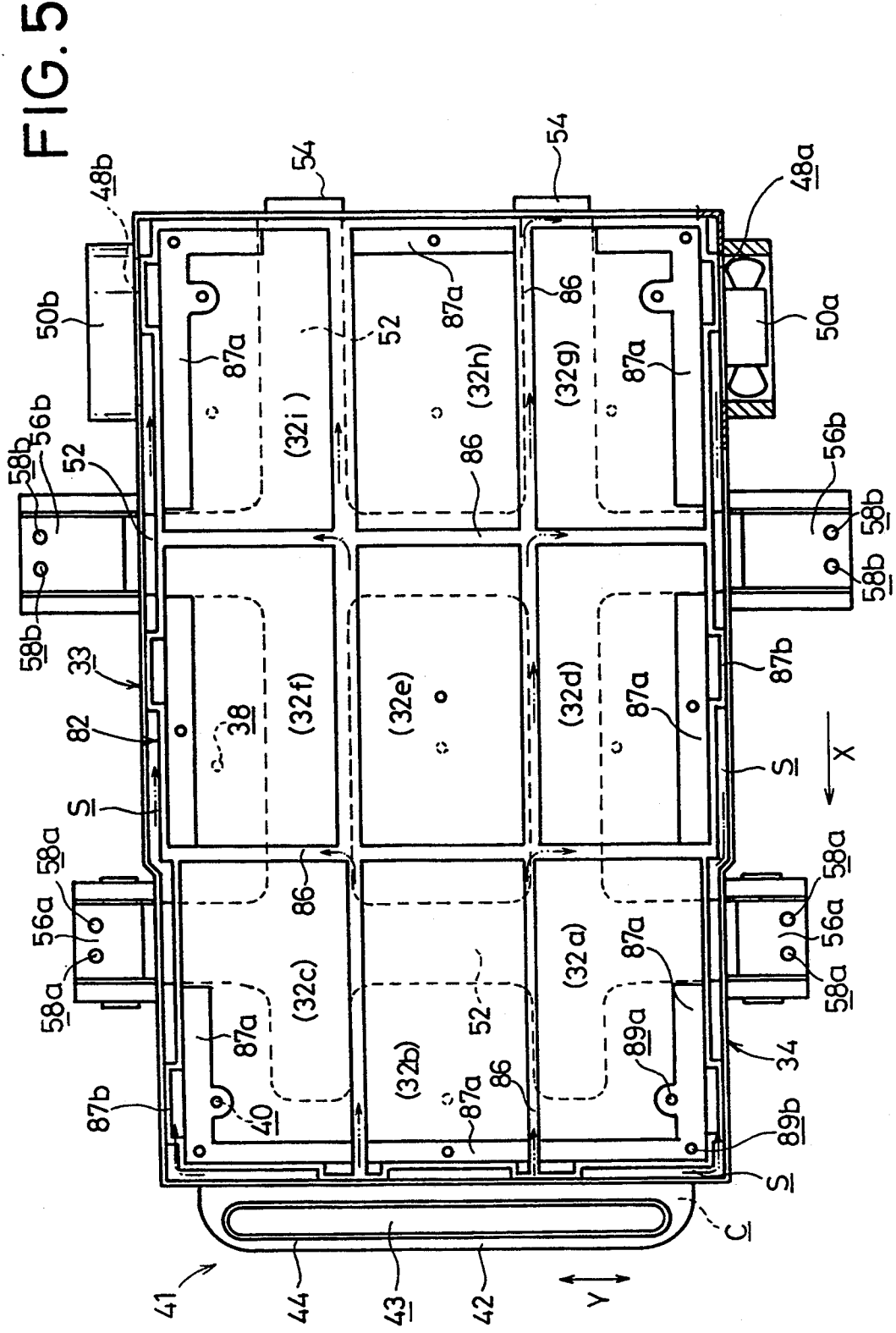
FIG. 5 is a plan view illustrating the manner in which a lower inner spacer member has been disposed in the body of the battery box.

FIG. 5 shows the manner in which a lower inner spacer member 82, to be described later, has been disposed in the box body 34. The box body 34 is constructed such that a front part thereof, which extends in the vehicle-body running direction (i.e., in the direction indicated by the arrow X), is reduced in width. The box body 34 has a plurality of drain holes 38 defined therein for discharging water or moisture to the outside and a plurality of mounting holes 40 for fixing the lower inner spacer member 82 provided therein with the batteries 32a through 32i, which are holes 38 and 40 located in regions where the reinforcement member 36 is not disposed.

A cooling means comprises the box body 34 and an intake air passage member 41. The intake air passage member 41 includes a casing 42 which is provided at the front end of the box body 34, and extends in the transverse direction (i.e., in the direction indicated by the arrow Y) of the vehicle. The passage member 41 includes a chamber C in which cooling air is introduced; a vertically-extending first passage 43 whose upper end communicates with the outside and whose lower end communicates with the lower side of the chamber C; a tubular body 44 which is fixed to an upper portion of the casing 42 and elongated in the vehicle transverse direction; and a second passage 46 which is defined in the front end of the box body 34, is elongated in the vehicle transverse direction and causes the upper side of the chamber C to communicate with the inside of the box body 34 (see FIG. 6). The casing 42 has a shock or impact buffering bent portion 42a provided at the lower end thereof and having drain holes 47 defined therein.

Holes 48a, 48b for discharging the cooling air are defined in both side walls of the box body 34, which are located on the rear side in the vehicle-body moving direction. Cooling fans 50a, 50b are fitted in the corresponding holes 48a, 48b (see FIG. 5).

The reinforcement member 36 comprises an inner plate 52 formed by deforming the inner walls of the box body 34 toward the inside of the box body 34, and outwardly-bent outer plates 54 fixed to the corresponding outer walls of the box body 34 by welding or the like and shaped in cross section so as to correspond to the inner plate 52. The inner plate 52 and the outer plates 54 extend in the longitudinal and transverse directions of the vehicle to support at least a portion of each of the batteries 32a through 32i. The outer plates 54 respectively include a pair of opposite frontal mounting portions 56a and a pair of opposite rear mounting portions 56b for mounting the box body 34 to the frame member 18. The two pairs of mounting portions extend in the vehicle transverse direction from the outer walls of the box body 34 on both sides thereof at locations spaced upwardly from the bottom of the box body 34.

Figure 4:
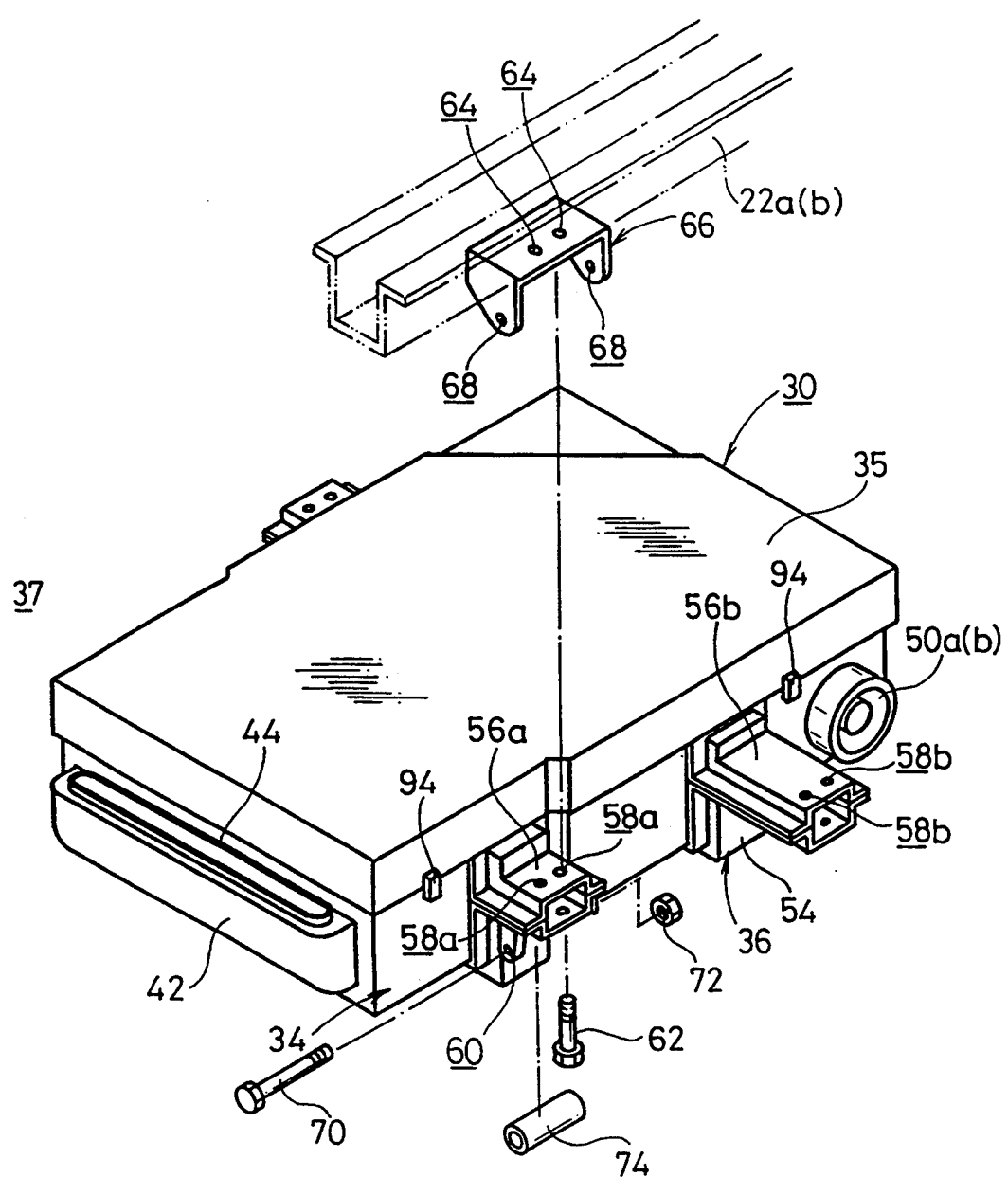
FIG. 4 is a portly exploded perspective view illustrating the manner of mounting of the battery box in the electric vehicle.

As shown in FIG. 4, each of the frontal mounting portions 56a has bolt insertion holes 58a, 58a which extend therethrough in the vertical direction, and bolt insertion holes 60, 60 which are disposed below the bolt insertion holes 58a, 58a and coaxially extend in the horizontal direction. Each of the rear mounting portions 56b has bolt insertion holes 58b, 58b which extend therethrough in the vertical direction. Bolts 62, which are inserted into their corresponding bolt insertion holes 58a, 58a and 58b, 58b, are threadedly inserted into their corresponding internally-threaded bores 64 defined in each of the sideframes 20a, 20b. Further, each of bolts 70 is inserted into its corresponding holes 68 defined in a bracket 66 fixed to each of the sideframes 20a, 20b and its corresponding bolt insertion holes 60, 60 of each frontal mounting portion 56a. A nut 72 is held in threaded engagement with an end of each bolt 70. A collar 74 is externally fitted on each bolt 70 and the outer peripheral surface of each collar 74 is spaced a predetermined interval from the heads of the bolts 62 in an opposing relationship to prevent dislodgement of the bolts.

A plurality of drain holes (not shown) for discharging the water or moisture which may accumulate between the outer plates 54 and the inner plate 52 to the outside are defined in the outer plates 54.

Figure 3:
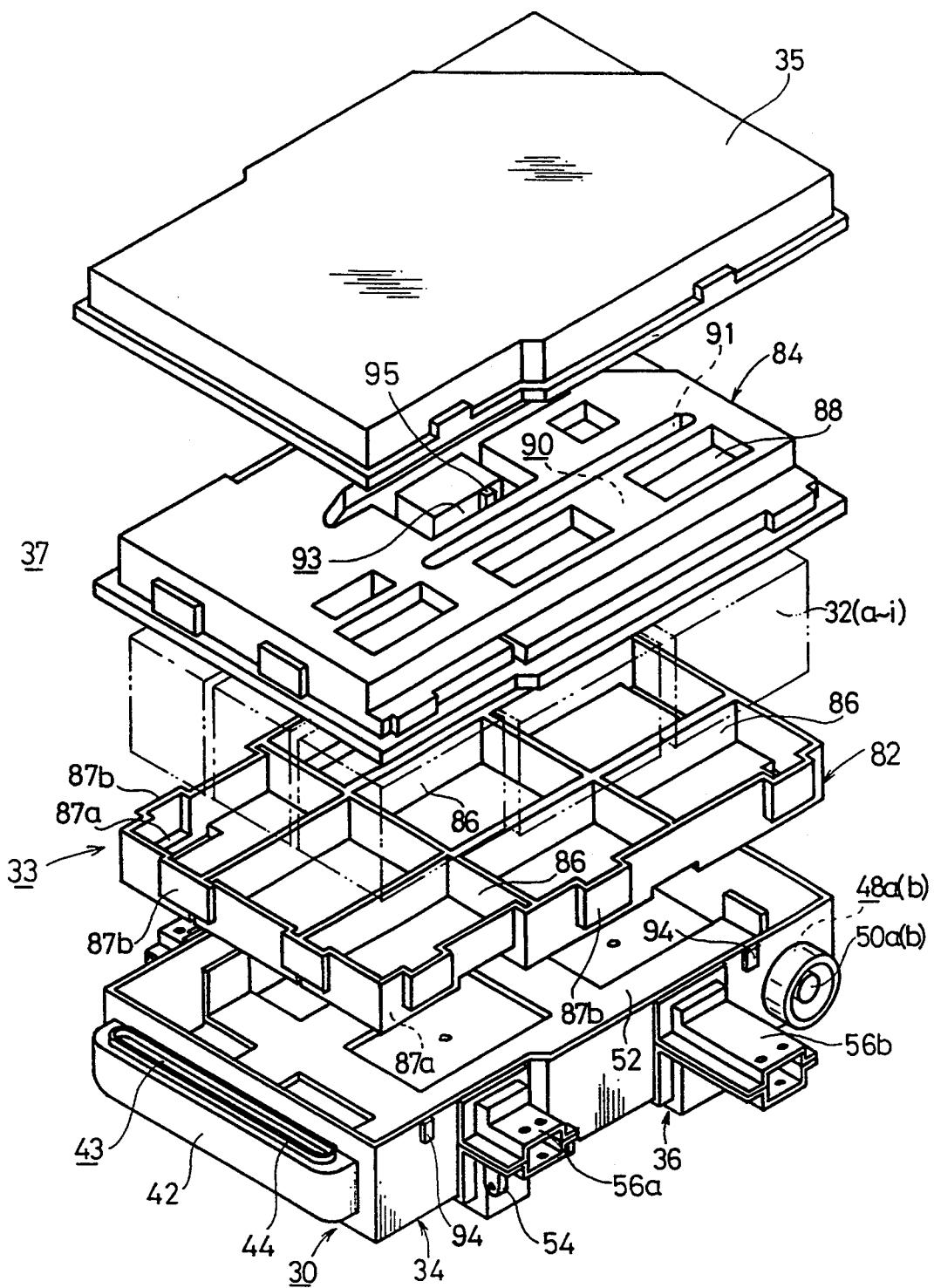
FIG. 3 is an exploded perspective view showing the battery securing structure according to the first embodiment.
Figure 6:
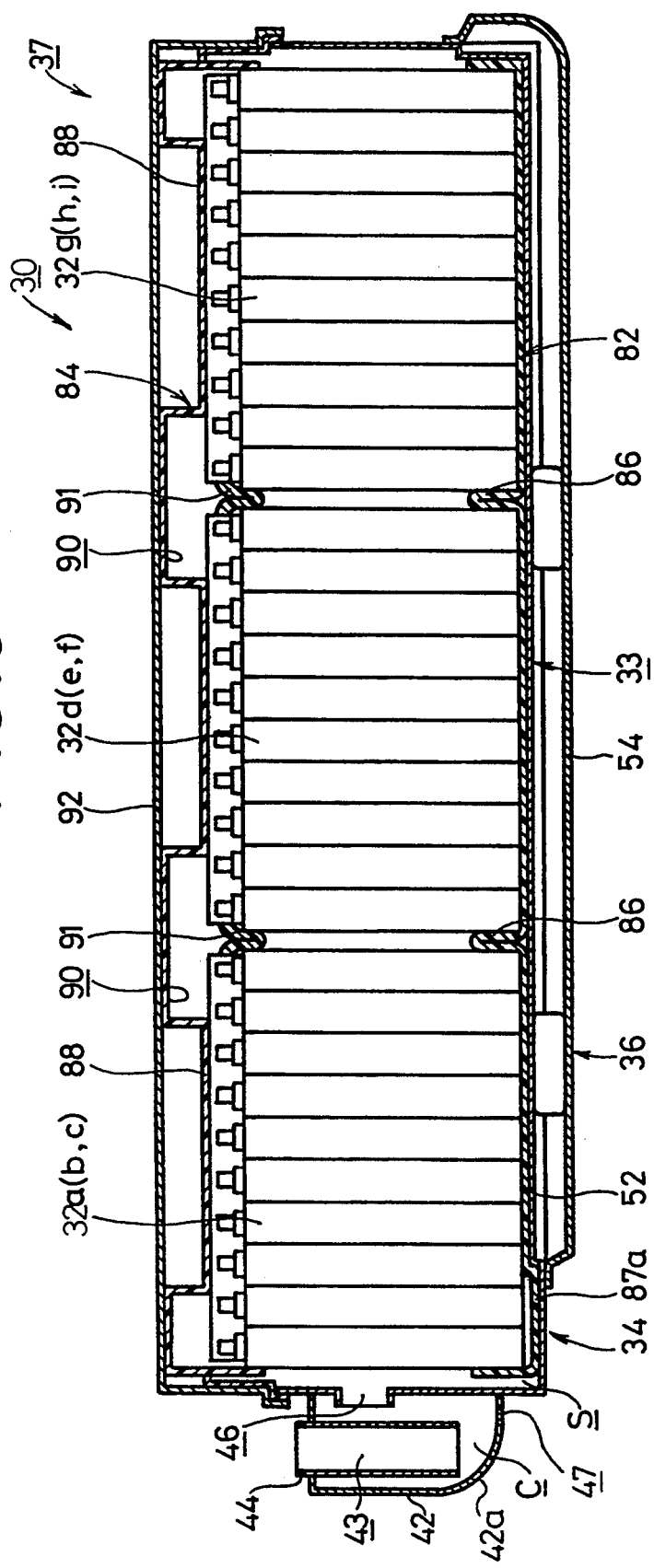
FIG. 6 is a vertical cross-sectional aide view showing the battery box.

The batteries 32a through 32i are accommodated within the battery box 30 in a state in which they are spaced away from each other by the inner spacer member 33 and separated from the inner wall surfaces of the battery box 30 (see FIGS. 3 and 6). The inner spacer member 33 comprises a lower inner spacer member 82 and an upper inner spacer member 84 each of which is made of a synthetic resin, for example, polypropylene (PP). The lower inner spacer member 82 includes partition portions or members 86 divided into nine compartments to dispose the nine batteries 32a through 32i separately from one another in such a manner that they cannot be moved. Lower expansion portions 87a and side expansion portions 87b for spacing the lower inner spacer member 82 a given interval from the bottom surface and the side surfaces of the box body 34 so as to define spaces S, are provided onto the bottom face and the side faces, respectively, of the lower inner spacer member 82. Each of the lower expansion portions 87a is provided in a position spaced away from the inner plate 52 of the box body 34 (see FIG. 5). The lower inner spacer member 82 has a plurality of holes 89a defined in the lower expansion portions 87a and disposed so as to correspond to the mounting holes 40 of the box body 34 for receiving mounting bolts, and a plurality of drain holes 89b defined in the lower expansion portions 87a.

Figure 7:
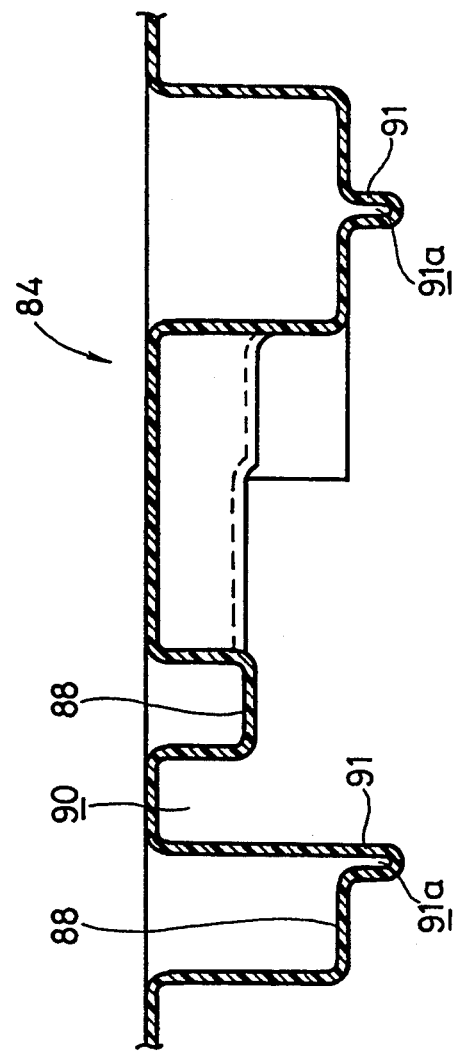
FIG. 7 is an enlarged fragmentary sectionary elevation view illustrating a central portion of an upper inner spacer member of the battery box along the transverse direction of the electric vehicle.

The upper inner spacer member 84 includes pressing portions or members 88 for pressing and holding desired portions of the batteries 32a through 32i, concave portions 90 for defining spaces used for conductive wires and cooling, and partition portions or members 91 divided into nine compartments to fixedly dispose the nine batteries 32a through 32i separately from each other, all of which are formed in an integral manner (see FIG. 6). As shown in FIG. 7, the partition members 91 are shaped in bent states and have spaces 91a defined thereinside, respectively. The batteries 32a through 32i are resiliently separated by the partition members 91 and spaces 91a. Incidentally, the partition members 86 of the lower inner spacer member 82 are also constructed in the same manner as the partition members 91 described above. An opening or aperture 93 is defined in the upper inner spacer member 84 at a given position of the upper inner spacer member 84 and a hydrogen sensor 95 is mounted in the aperture 93 (see FIG. 3). As illustrated in FIG. 5, intervals between the respective adjacent batteries 32a through 32c provided adjacent to the intake air passage member 41 are set so as to be narrower than those between the respective adjacent batteries 32d through 32f and those between the respective adjacent batteries 32g through 32i.

The batteries 32a through 32i are accommodated in the box body 34 in a state in which the upper and lower surfaces of the batteries 32a through 32i are secured by the lower inner spacer member 82 and the upper inner spacer member 84. The cover 35 is mounted on the upper inner spacer member 84 so as to be fixed integrally with the box body 34 by lock members 94. The cover 35 and the box body 34 are sealed by interposing the edges of the upper inner spacer member 84 between the cover 35 and the box body 34. The lower inner spacer member 82 is fixed to the box body 34 by threadedly inserting unillustrated bolts through holes 89a in the lower inner spacer member 82 and the corresponding mounting holes 40 of the box body 34.

As shown in FIG. 1, a floor 100 is formed above the battery box 30 and has a lower floor 102 and an upper floor 104. A chamber 106 is defined between the lower floor 102 and the upper floor 104. The chamber 106 accommodates therein a motor controller 108, a distribution box 110 and a voltage transformer 112 for changing or reducing the total high voltage supplied from the batteries 32a through 32i to a predetermined low voltage (see FIGS. 1 and 2).

The motor controller 108 includes a power drive unit 116 accommodated within a box 114. An air feed port for a cooling fan 118 is provided on the leading end side of the box 114 and exhaust ducts 120a, 120b are provided on the rear end side of the box 114. The exhaust ducts 120a, 120b have ends open within the crossmember 22b. An opening or aperture 122, which is opened toward or communicates with the interior of the vehicle body 16, is defined in the leading end of the upper floor 104. Air in the vehicle interior is introduced into the box 114 via the aperture 122 under the action of the fan 118.

A drive motor 130 is provided in the rear end of the vehicle body 16. The motor 130 is coupled via a transmission 132 to a rear-wheel drive shaft 134. A cooling fan 138 is coupled to the motor 130 by a duct 136 and an intake port or opening of the fan 138 is opened toward the reverse side of a bumper 139 of the vehicle body 16. The duct 136 is bent upwardly between the fan 138 and the motor 130. The duct 136 is used to directly supply cooling air to the rotatable shaft of the motor 130. The cooling air passes through the inside of a cover 140 of the motor 130 and is discharged to the outside from a discharge or withdrawal port 142.

An auxiliary battery 144 is mounted in the rear end of the vehicle body 16 and is used to light vehicle lighting equipment, for example.

The operation of the electric vehicle 10 constructed as described above will now be described in connection with the battery securing structure 37 according to the first embodiment.

First, the motor controller 108 is activated to drive the motor 130 in accordance with electric power supplied from the batteries 32a through 32i. Thus, the rear-wheel drive shaft 134 coupled to the transmission 132 is rotated so as to rotate the rear wheels 14, thereby driving the electric vehicle 10. At this time, the nine batteries 32a through 32i are electrically series-connected to each other and actually output a high voltage of 108 V. The high voltage thus output is reduced to a given voltage by the voltage transformer 112 and the reduced voltage is supplied to the motor 130.

When the cooling fans 50a, 50b are driven while the vehicle is running or remains stopped, the external cooling air is introduced into the box body 34 from the intake air passage member 41. The cooling air circulates in the box body 34 as indicated by the arrows which are represented by the two-dot chain lines in FIG. 5. Therefore, the batteries 32a through 32i, which have boon accommodated in the box body 34, are cooled by the cooling air, thereby making it possible to prevent the batteries 32a through 32i from reaching an undesirable temperature or higher. Since the fans 50a, 50b are provided on both sides of the box body 34 and are located on the rear side as seen in the vehicle-body running direction, the cooling air, which has been introduced into the box body 34 from the intake air passage member 41, can flow through the intervals defined between the respective adjacent batteries 32a through 32i. It is also possible to reliably cool even the battery 32e which is centrally located and tends to easily reach a high temperature. Incidentally, the batteries 32a through 32c are provided closest to the intake air passage member 41 although the intervals between the respective adjacent batteries 32a through 32c are relatively narrow. Therefore, cooling air of a low temperature can be supplied to the batteries 32a through 32c so that they are effectively cooled.

As shown in FIG. 6, the external cooling air is first vertically taken in from the upper side of the intake air passage member 41 through the first passage 43 defined in the tubular body 44 and temporarily introduced into the lower side of the chamber C. Thereafter, the cooling air is supplied to the inside of the box body 34 through the second passage 46 provided on the upper side of the chamber C. Thus, even if undesired liquids or objects such as water, mud, rocks, etc. enter the chamber C through the first passage 43, they are simply deposited in the lower portion of the chamber C and do not flow up to the second passage 46 disposed on the upper side of the chamber C because the cooling air is introduced into the box body 34 in a zigzag manner in upper and lower directions. As a result, any undesirable liquids or objects can be prevented from being introduced into the box body 34. Thus, it is also possible to effectively avoid rust or corrosion damage of the components connecting the batteries 32a through 32i to one another. Incidentally, the undesirable liquids and small objects which have been introduced into the chamber C are discharged to the outside through the drain holes 47.

In the first embodiment, the respective batteries 32a through 32i are disposed in such a manner that they are spaced from each other by the partition members 86 and 91 on the lower inner spacer member 82 and the upper inner spacer member 84, respectively, of the inner spacer member 33 and cannot move. Therefore, even if the batteries 32a through 32i are relatively heavy in weight as a single unit, the batteries 32a through 32i can be reliably and firmly fixed by accommodating the batteries 32a through 32i into the box body 34 and mounting the cover 35 thereon. Since the inner spacer member 33 is interposed between the box body 34 and the cover 35, it is unnecessary to fix the inner spacer member 33 to the batteries 32a through 32i. It is therefore possible to easily effect a process for securing the batteries 32a through 32i.

Further, since each of the lower and upper inner spacer members 82, 84 of the inner spacer member 33 is made of polypropylene (PP) or the like, there is no risk of the terminals of the batteries 32a through 32i being shorted by contact with a metallic member, e.g., the cover 35. Even if an impact is externally applied to the battery box 30, the impact can be absorbed by a resilient force of the inner spacer member 33, thereby making it possible to reliably avoid the influence of the impact on the batteries 32a through 32i.

Since the lower expansion portions 87a and the side expansion portions 87b are provided on the bottom face and the side faces, respectively, of the lower inner spacer member 82 as described above, the batteries 32a through 32i can be separated from the box body 34. It is therefore possible to prevent the batteries 32a through 32i from contacting with the box body 34 which is a metallic member. Further, the cooling air can be smoothly circulated through the spaces between the adjacent batteries 32a through 32i provided by the partition members 86, 91, thereby making it possible to easily cool the batteries 32a through 32i.

In addition, upwardly concave portions 90 are defined in the upper inner spacer member 84. Thus, the terminals of the batteries 32a through 32i and connectors between terminals can be provided in the concave portions 90 and the circulation of the cooling air can be facilitated. Incidentally, the hydrogen sensor 95 is mounted in the aperture 93 defined in the upper inner spacer member 84. The hydrogen sensor 95 automatically determines or detects whether or not the hydrogen gas of a given amount or more exists in the box body 34.

The upper inner spacer member 84 may be simply detached from the upper side of the batteries 32a through 32i in a state in which the cover 35 has been opened or released from the box body 34 through the lock members 94. It is thus possible to easily and efficiently effect maintenance processes such as a process for the replacement of the batteries 32a through 32i, etc.

A battery securing structure according to a second embodiment of the present invention will now be described below in connection with an electric vehicle to which the securing structure is applied.

Figure 8:
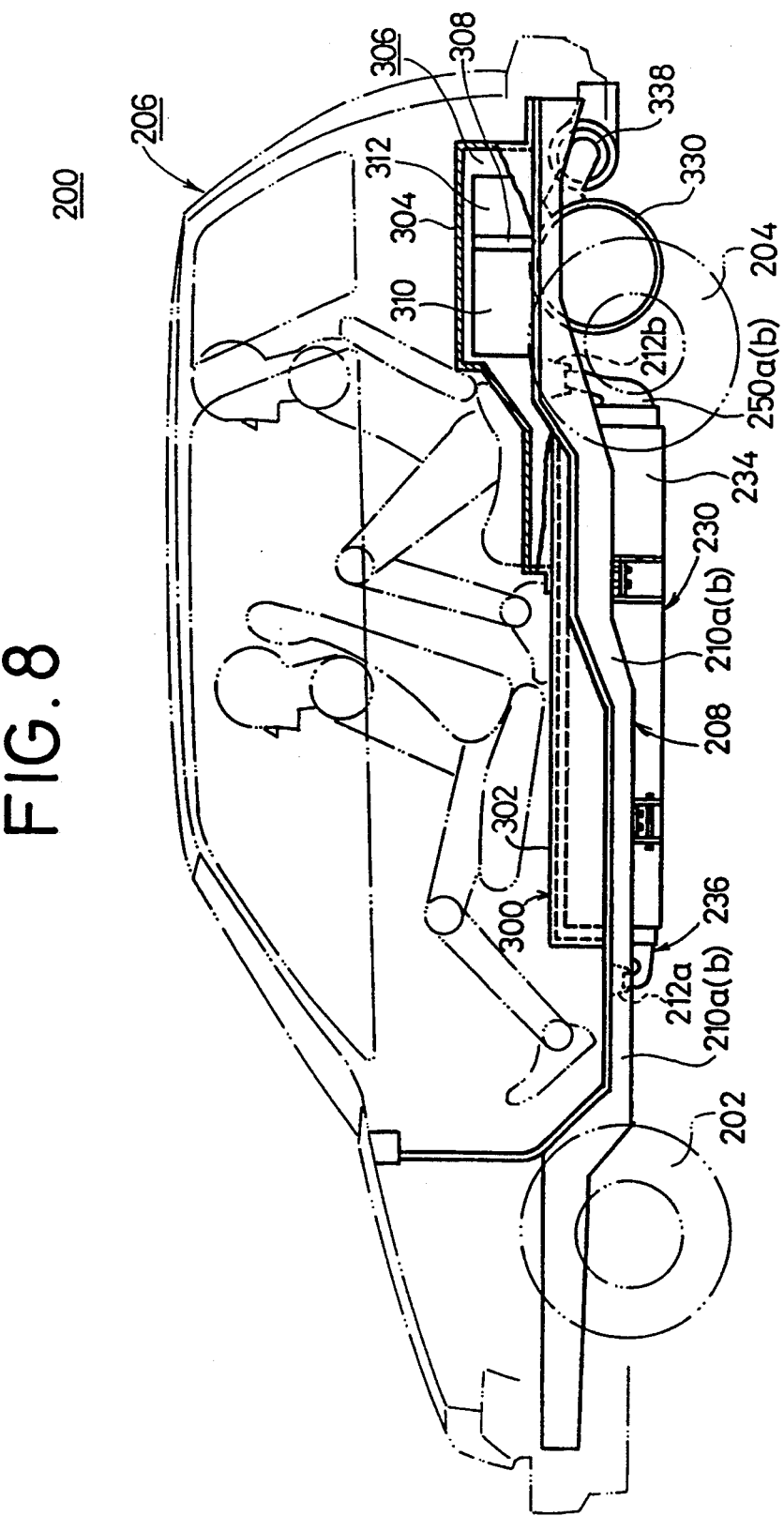
FIG. 8 is a side view schematically showing the construction of an electric vehicle having a battery securing structure according to a second embodiment of the present invention incorporated therein, in which an upper floor is partly cut away to illustrate a frame member.
Figure 9:
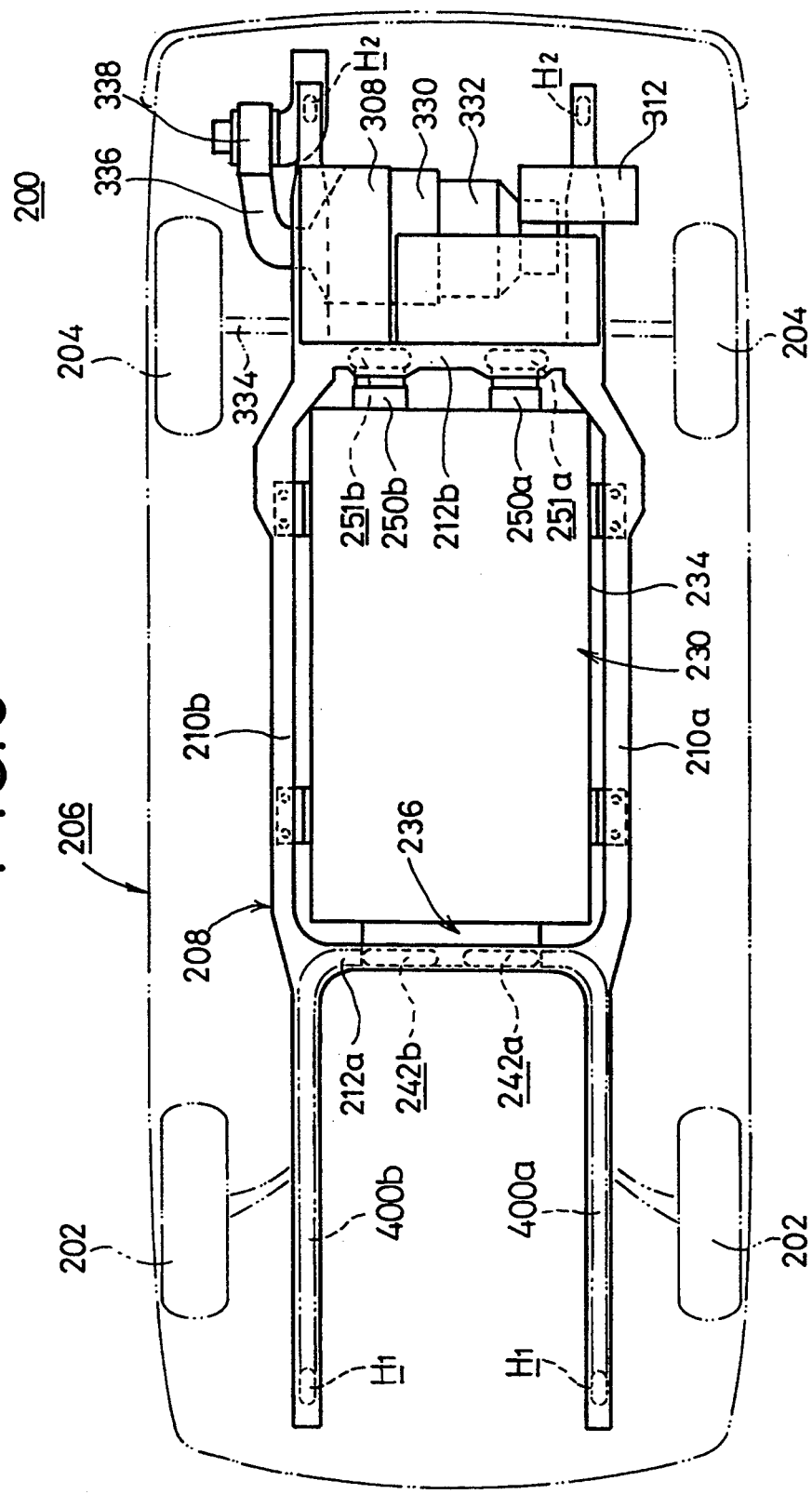
FIG. 9 is a schematic plan view illustrating the manner in which the components of the electric vehicle shown in FIG. 8 are arranged.
Figure 10:
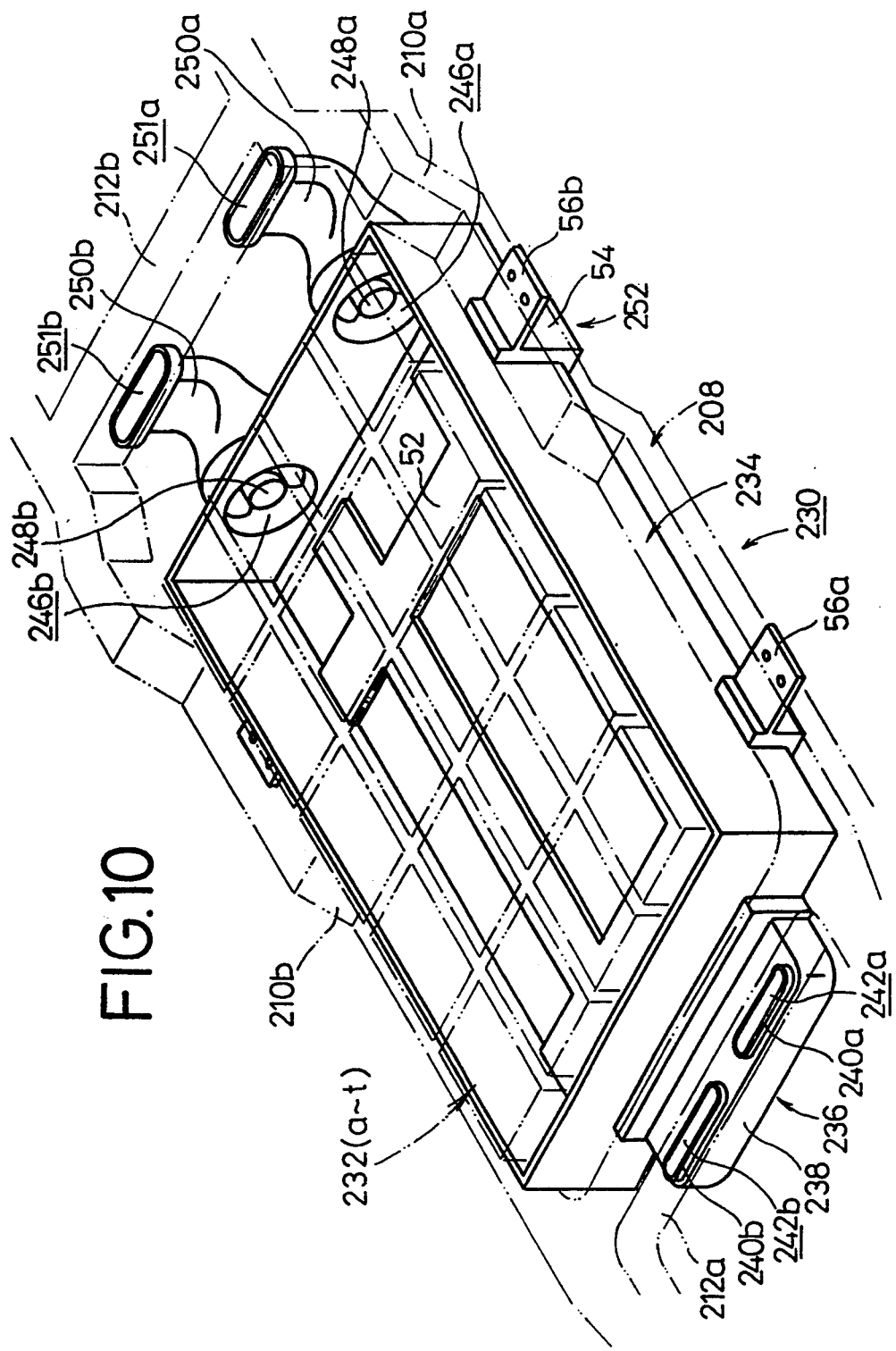
FIG. 10 is a perspective view showing a box body of the battery securing structure shown in FIG. 8.

Referring to FIGS. 8 and 9, reference numeral 200 indicates an electric vehicle to which the battery securing structure according to the second embodiment is applied. The electric vehicle 200 comprises front wheels 202, rear wheels 204 and a vehicle body 206. A frame member 208 of the vehicle body 206 has a hollow front-side crossmember 212a and a hollow rear-side crossmember 212b provided between sideframes 210a and 210b (see FIG. 9).

A battery box 230, which is provided between the front wheels 202 and the rear wheels 204, is held by the sideframes 210a, 210b in a suspended state. As shown in FIGS. 10 through 13, the battery box 230 comprises a box body 234 which accommodates twenty batteries 232a through 232t therein for driving the electric vehicle 200 and is mounted to the electric vehicle 200. The batteries 232a through 232t each provide 12 V and are electrically series-connected to one another so as to actually output 240 V.

The securing structure 237 according to the second embodiment comprises the box body 234, an inner spacer member 233 and a cover 235. The box body 234 has an intake air passage member 236 which is opened toward or communicates with the inside of the front-side crossmember 212a of the frame member 208 and introduces cooling air into the box body 234 from the crossmember 212a. The intake air passage member 236 includes a casing 230 which is mounted to the front end (in a vehicle-body running direction) of the box body 234 and extends in the vehicle transverse direction. Casing 238 has a chamber C defined therein, through which the cooling air is introduced. Tubular bodies 240a, 240b are fixed to an upper portion of the casing 238 and the crossmember 212a of the frame member 208 and are elongated in the vehicle transverse direction. The tubular bodies 240a, 240b have vertically-extending first passages 242a, 242b, respectively, whose upper ends communicate with the inside of the crossmember 212a and whose lower ends communicate with the chamber C. The first passages 242a, 242b communicate with the inside of the box body 234 through a second passage 244 defined in the front end of the box body 234 (see FIG. 13).

Holes 246a, 246b are defined in the rear end of the box body 234 and cooling fans 240a, 240b are mounted in their corresponding holes 246a, 246b. Ducts 250a, 250b for surrounding the cooling fans 248a, 248b, respectively, and discharging the cooling air from the box body 234 are fixed to the box body 234. The ducts 250a, 250b are shaped in the form of curved tubes of changing cross-section from cylindrical to oval. One end of each of the ducts 250a, 250b communicate with the holes 246a, 246b respectively, whereas the other end passage 251a, 251b thereof communicates with the inside of the crossmember 212b.

The box body 234 has a reinforcement portion or member 252. The reinforcement member 252 is constructed in a manner similar to the reinforcement member 36 of the electric vehicle 10 to which the securing structure according to the first embodiment is applied. The same elements of structure as those which constitute the reinforcement member 36, are identified by like reference numerals and will not be described in detail.

The batteries 232a through 232t are accommodated within the battery box 230 in a state in which they have been spaced away from each other by the inner member 233 and separated from the inner wall surfaces of the battery box 230. The inner spacer member 233 comprises a lower inner spacer member 282 and an upper inner spacer member 284, each of which is composed of a synthetic resin, for example, polypropylene (PP). The lower inner spacer member 282 includes, as a single unit, partition portions or members 286 divided into twenty compartments to dispose the twenty batteries 232a through 232t separately from one another. Lower expansion portions 287a and side expansion portions 287b are provided onto the bottom face and the side faces of the lower inner member 282, respectively, for spacing the lower inner spacer member 282 only a given distance from the bottom face and the side faces of the box body 234 so as to define spaces S.

The upper inner spacer member 284 comprises pressing portions or members 288 for pressing and holding desired portions of the batteries 232a through 232t, concave portions 290 for defining spaces used for conductive wires and cooling, and partition portions or members 291 divided into twenty compartments to unmovably dispose all the batteries 232a through 232t in a state in which they are separated from each other. An opening or aperture 293 is defined in the upper inner spacer member 284 at a given position of the upper inner spacer member 284 and a hydrogen sensor 295 is mounted in the aperture 293.

The batteries 232a through 232t are accommodated within the box body 234 in a state in which the upper and lower surfaces of the batteries 232a through 232t are held by the lower inner spacer member 282 and the upper inner spacer member 284. The cover 235 is mounted on the upper inner spacer member 284 so as to be fixed integrally with the box body 234.

As shown in FIG. 8, a floor 300 is formed above the battery box 230 and has a lower floor 302 and an upper floor 304 provided on the rear side of the floor 300. A chamber 306 is defined between the lower floor 302 and the upper floor 304. The chamber 306 accommodates therein a motor controller 308, a distribution box 310 and a voltage transformer 312 for changing or reducing the total high voltage supplied from the batteries 232a through 232t to a predetermined low voltage (see FIGS. 8 and 9).

A drive motor 330 is provided in the rear end of the vehicle body 206. The motor 330 is coupled via a transmission 332 to a rear-wheel drive shaft 334. A cooling fan 338 is coupled to the motor 330 by a duct 336.

In the battery securing structure 237 according to the second embodiment, the respective batteries 232a through 232t are unmovably disposed in a state in which they have been spaced away from each other by the partition members 286 and 291 mounted to the lower and upper inner spacer members 282 and 284, respectively, of the inner spacer member 233. Therefore, the batteries 232a through 232t can be firmly held in a state in which all the batteries 232a through 232t have been spaced away from one another by the partition members 286 of the lower inner spacer member 282 and the partition members 291 of the upper inner spacer member 284, by disposing the upper inner spacer member 284 on the batteries 232a through 232t placed on the lower inner spacer member 282 within the box body 234 and mounting the cover 235 on the upper inner spacer member 284. Thus, the batteries 232a through 232t, which are relatively heavy in weight, can be reliably and firmly secured and fixed within the battery box 230 as a single unit.

When the cooling fans 248a, 248b are driven, the cooling air is introduced into the chamber C from the inside of the crossmember 212a through the first passages 242a, 242b of the tubular bodies 240a, 240b of the intake air passage member 236. Further, the cooling air enters the box body 234 through the second passage 244 and cools the batteries 232a through 232t. Thereafter, the cooling air is discharged into the crossmember 212b from the holes 246a, 246b through the discharge air passage members or ducts 250a, 250b and passages 251a, 251b (see FIG. 13).

Thus, the cooling air is introduced into the intake air passage member 236 from the insides of the sideframes 210a, 210b through the inside of the cross-member 212a. It is therefore possible to reliably prevent undesirable liquids and objects such as water, mud, rocks, etc. from externally entering the intake air passage member 236. Thus, it is also possible to effectively avoid rust or corrosion damage of the components connecting the batteries 232a through 232t to one another. By providing air intake holes or openings H1, H1 (see FIG. 9) in the leading ends of the sideframes 210a, 210b, then the intake air noises produced in the interior of the vehicle can be minimized or eliminated.

Further, the discharge air passage members 250a, 250b, which communicate with the holes 246a, 246b, respectively, of the box body 234, are in communication with the inside of the crossmember 212b. Therefore, water and mud or the like can be reliably prevented from entering the box body 234 through the holes 246a, 246b. In addition, an anti-noise measure with respect to the air discharge can be taken by defining air discharge holes H2, H2 in the rear ends of the sideframes 210a, 210b, respectively.

Incidentally, in the second embodiment, the inside of the frame member 208 is used as a tube or pipe for the passage of air. When, however, rust or the like exists in the frame member 208, the rust or the like tends to enter the box body 234. Therefore, pipes or lines 400a, 400b made of polypropylene (PP), for example, can be used so as to enable communication between the first passages 242a, 242b, respectively, of the intake air passage member 236 and the air intake openings HI, as indicated by the two-dot chain lines in FIG. 9. It is thus possible to reliably prevent rust or the like from entering the box body 234.

Incidentally, the other-operations and advantages are identical to those obtained by the battery securing structure 37 according to the first embodiment, and their detailed description will therefore be omitted.

Figure 11:
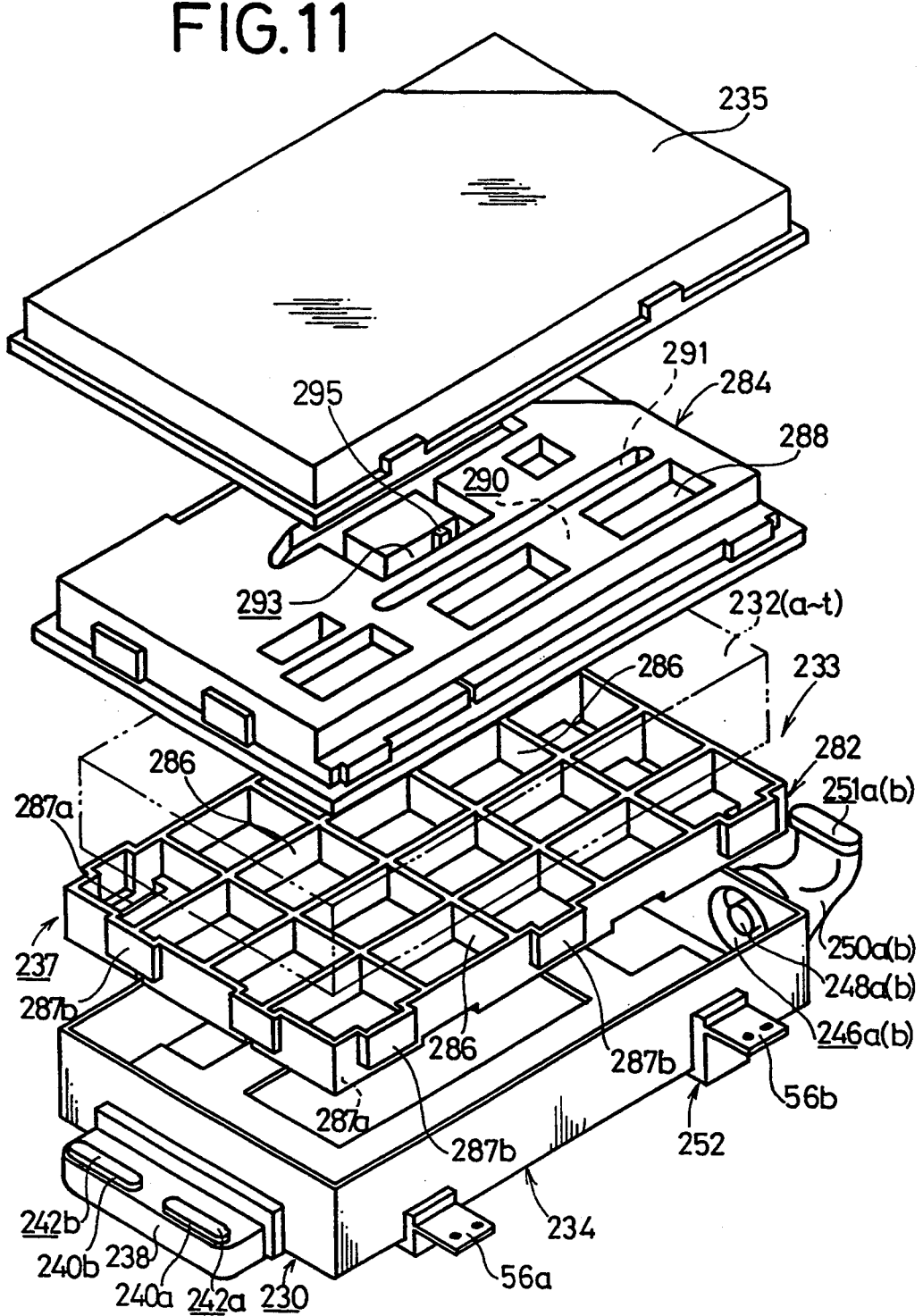
FIG. 11 is an exploded perspective view showing the battery securing structure shown in FIG. 8.
Figure 12:
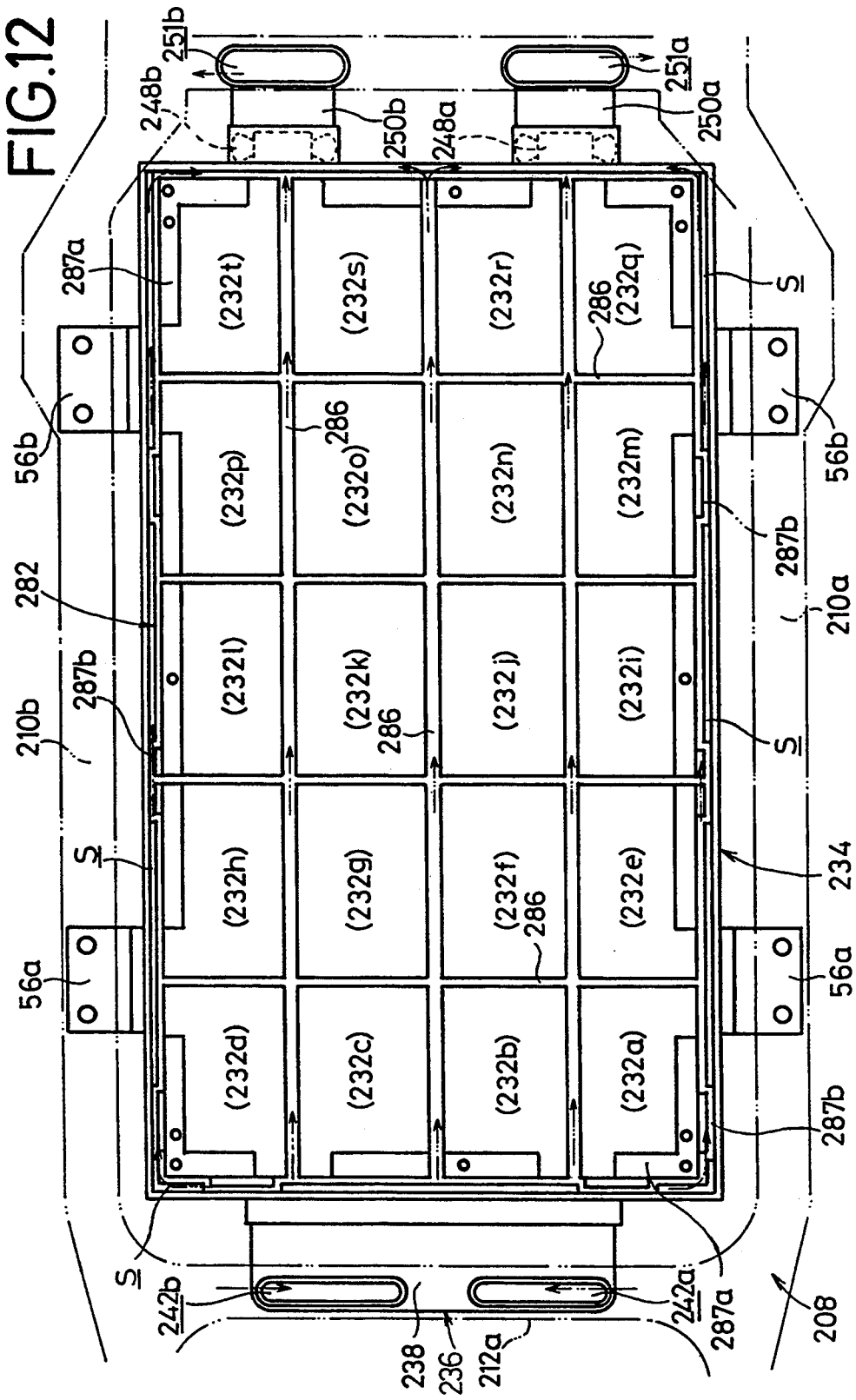
FIG. 12 is a plan view illustrating the manner in which a lower inner spacer member has been disposed in the box body shown in FIG. 10.
Figure 13:
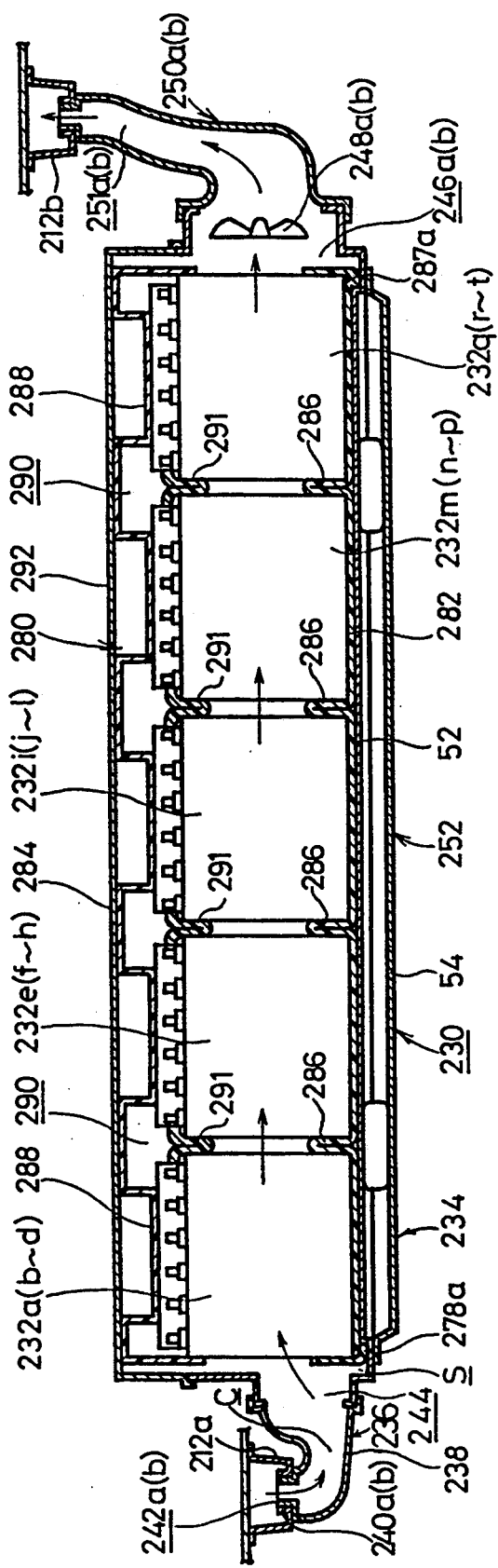
FIG. 13 is a vertical cross-sectional side view showing a battery box of the battery securing structure according to the second embodiment.
Figure 14:
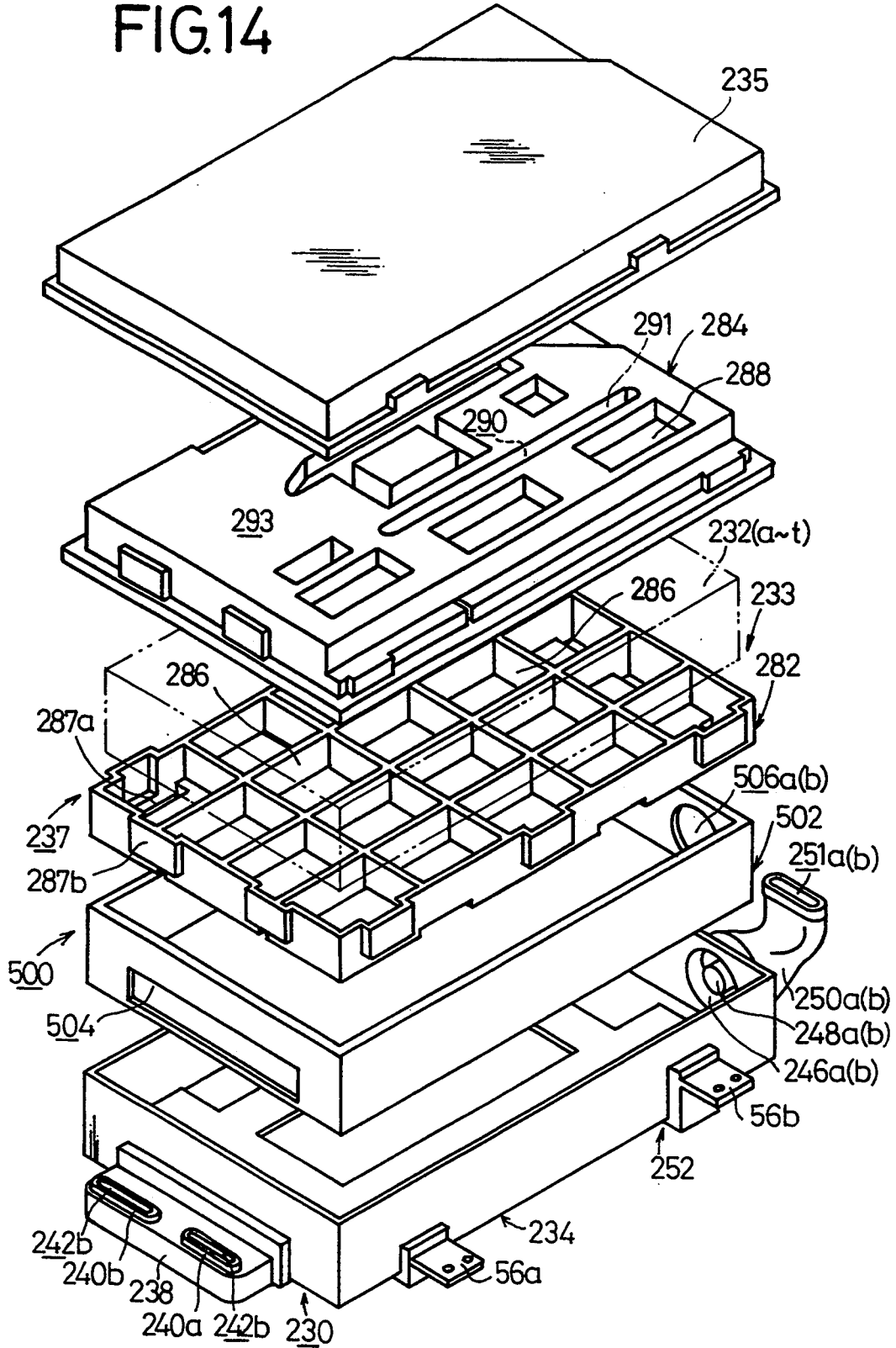
FIG. 14 is an exploded perspective view illustrating a battery securing structure according to a third embodiment of the present invention.
Figure 15:
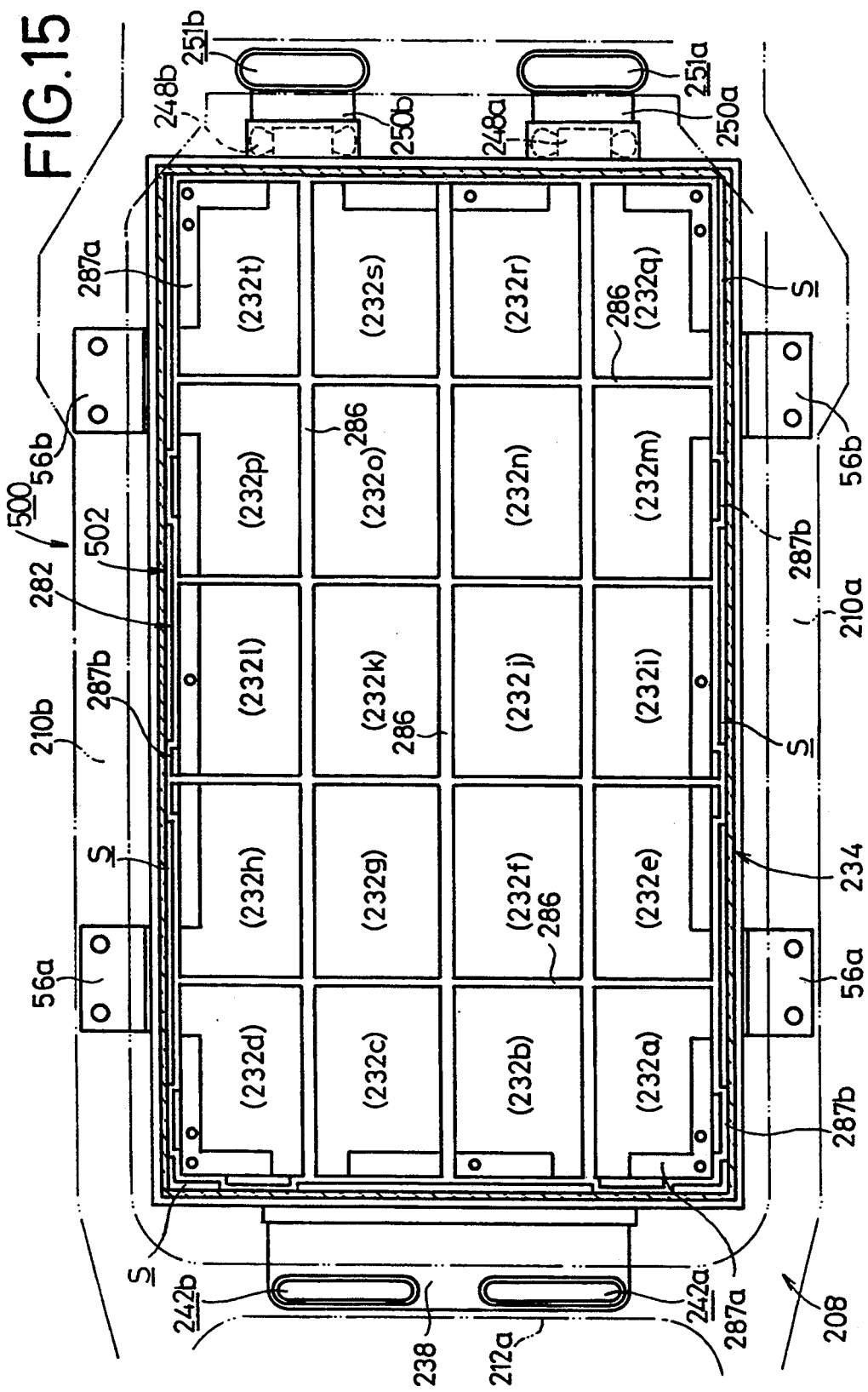
Figure 16:
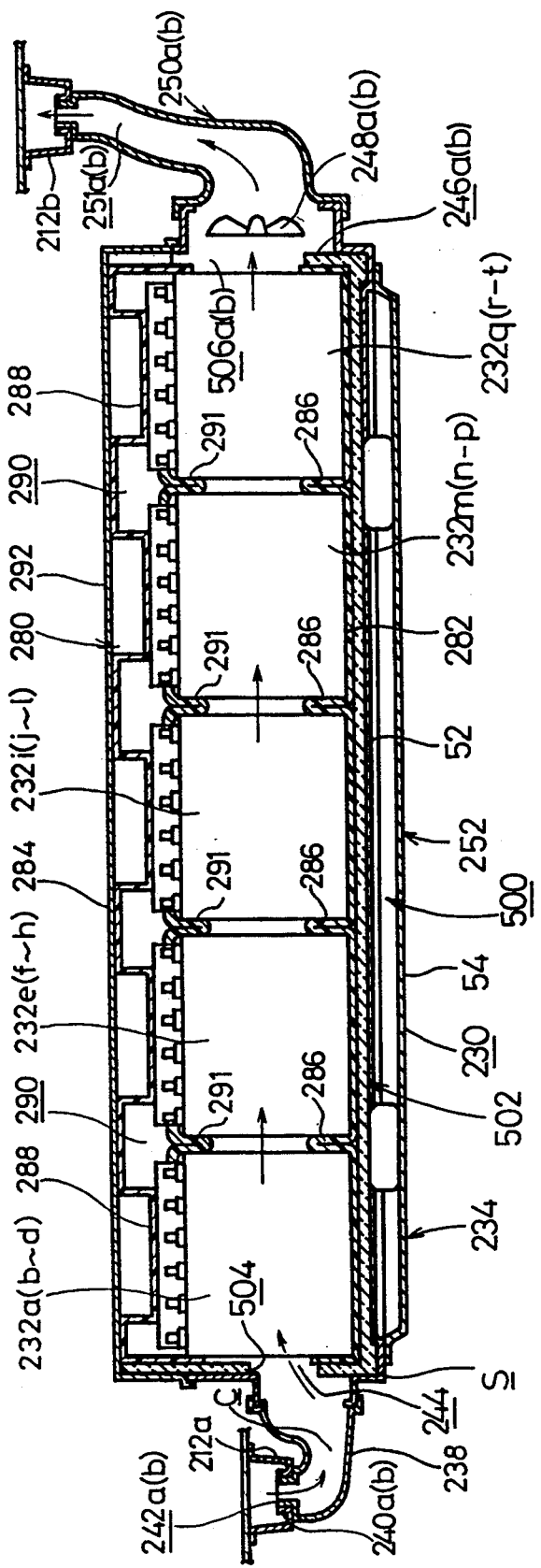
FIG. 16 is a vertical cross-sectional side view showing a battery box employed in the third embodiment.

A battery securing structure 500 according to a third embodiment of the present invention will now be described below with reference to FIGS. 14 through 16. Incidentally, the same elements of structure as those shown in FIGS. 11 through 13 are identified by like reference numerals and their detailed description will therefore be omitted.

The securing structure 500 has a thermal insulator 502 interposed between a box body 234 and an inner spacer member 233. The thermal insulator 502 is made of an expanded plastic, for example. The thermal insulator 502 is shaped in the form of a casing and set to dimensions which enable a lower inner spacer member 282, batteries 232a through 232t and an upper inner spacer member 284 to be integrally accommodated therein (see FIG. 16). An opening or aperture 504, which communicates with the second passage 244 of the box body 234, is defined in one end of the thermal insulator 502. Further, holes 506a, 506b, which respectively communicate with holes 246a, 246b of the box body 234, are defined in the other end of the thermal insulator 502.

Thus, in the securing structure 500 according to the third embodiment, all the batteries 232a through 232t are surrounded by the thermal insulator 502 within the box body 234. In this manner, the batteries 232a through 232t can be effectively prevented from being subjected to a high temperature due to the outside air temperature.

Incidentally, the securing structure 500 according to the third embodiment is constructed so as to be incorporated into an electric vehicle 200. However, the securing structure 500 is not necessarily limited to the example referred to above. The securing structure 500 may also be used in the electric vehicle 10.

According to a structure of the present invention, for securing batteries used for an electric vehicle, a plurality of batteries are unmovably disposed in a state in which they have been separated from each other by partition portions or members formed in an inner spacer member. Therefore, the batteries are no longer movable within a box body and can be reliably secured or fixed. Further, various maintenance Operations such as replacement of a plurality of batteries, etc. can be easily and efficiently carried out by simply detaching the upper inner spacer member.

Further, when external cooling air is introduced into the box body from an intake air passage member, the cooling air is temporarily brought into the lower end side of a chamber from above through at least one first passage. Thereafter, the cooling air is introduced into the box body through a second passage defined in an upper portion of the chamber. Therefore, water and mud or the like can be prevented from entering the box body through the second passage even if they externally enter into the chamber via the first passage.

Furthermore, the intake air passage member for introducing the cooling air into the box body is left open within a front-side crossmember. The cooling air is introduced into the box body from the front-side crossmember. It is thus possible to reliably prevent water and mud or the like from entering into the box body from the outside.

Having now fully described the invention, it will be apparent to those skilled in the art that many changes and modifications can be made without departing from the spirit or scope of the Invention as set forth herein.

We claim:

1. A structure for securing each battery of a plurality of batteries for driving an electric vehicle in the electric vehicle in a condition in which said plurality of batteries have been compactly disposed and wherein each said battery has a bottom and sides, comprising:

a battery box having a box body, an inner spacer member in said box body for accommodating said plurality of batteries in said box body of said battery box, wherein said inner spacer member has a lower inner spacer member for placing said bottom of each said battery of said plurality of batteries thereon, said lower inner spacer member having means for defining spaces between said box body and said lower inner spacer member, and said inner spacer member further including partition members formed as an integral body, said partition members defining a plurality of spaced compartments for fixedly disposing each said battery of said plurality of batteries in a compartment of said plurality of spaced compartments in a condition in which each said battery is spaced and separated on all said sides of that said battery from all other said batteries of said plurality of batteries, each said compartment of said plurality of spaced compartments receiving only one said battery of said plurality of batteries in said compartment.

2. A structure according to claim 1, wherein said inner spacer member has an upper inner spacer member for pressing and holding an upper surface of said plurality of batteries.

3. A structure according to claim 2, wherein said upper inner spacer member has concave portions for defining predetermined spaces between the upper surface of said plurality of batteries and said upper inner spacer member.

4. A structure according to claim 2, wherein said upper inner spacer member has a hydrogen sensor mounted therein.

5. A structure according to claim 1, wherein said inner spacer member is made of a resinous material.

6. A structure according to claim 1, further including a thermal insulator which accommodates therein said plurality of batteries disposed in said inner spacer member and is supported within said box body.

7. A structure according to claim 1, further including an intake air passage member for introducing cooling air into said box body, said intake air passage member comprising a chamber in which the cooling air is received, at least one first passage for introducing external cooling air into a lower side of said chamber from an upper portion of said chamber, and a second passage provided on an upper side in said chamber and used to introduce the cooling air brought into said chamber into said box body.

8. A structure according to claim 7, wherein said intake air passage member is mounted to a front end of said box body, in a vehicle running direction, and discharge holes for discharging the cooling air are opened in at least one side wall of said box body at a rearward location in the vehicle running direction.

9. A structure according to claim 8, wherein said intake air passage member has an impact buffering bent portion provided at a lower end thereof.

10. A structure according to claim 8, wherein two said discharge holes are located in two lateral side walls of said box body.

11. A structure according to claim 8, wherein two said discharge holes are located on a rear side wall of said box body in the vehicle running direction.

12. A structure according to claim 11, wherein said intake air passage member has an impact buffering bent portion provided at a lower end thereof.

13. A structure according to claim 1, further including an intake air passage member for introducing cooling air into said box body, said intake air passage member being opened within a front-side crossmember of a frame member of a vehicle body so as to introduce the cooling air into said box body from said front-side crossmember.

14. A structure according to claim 13, further including at least one discharge air passage member for discharging the cooling air from said box body, said discharge air passage member being opened within the frame member of the vehicle body at a rearward location, in the vehicle running direction so as to discharge the cooling air in said box body into said frame member.

15. A structure according to claim 13, further including an intake air passage means of non-metallic material positioned within said frame member for supplying cooling air to said intake air passage member.

16. A structure according to claim 13, further including at least one discharge air passage member for discharging the cooling air from said box body, said discharge air passage member being opened within a rear-side crossmember of the frame member of the vehicle body so as to discharge the cooling air in said box body into said rear-side crossmember.

17. A structure according to claim 1, wherein said inner spacer member has an upper inner spacer member for placing on top of said plurality of batteries, said upper inner spacer member having means for defining spaces between said box body and said upper inner spacer member.

18. A structure according to claim 1, wherein said partition members of said inner spacer member include wall means extending between at least portions of adjacent side walls of all of said plurality of batteries.

19. A structure according to claim 18, wherein said wall means extend vertically upward from the bottom of the batteries and downward from the top of the batteries and provide a cooling air space between said plurality of batteries in a vertical space between the upwardly and downwardly extending wall means.

20. A structure according to claim 18 wherein said wall means comprise a double wall integrally connected at an extending edge with a space provided between the double walls.

21. A structure for securing each battery of a plurality of batteries for driving an electric vehicle in the electric vehicle in a condition in which said plurality of batteries have been compactly disposed and wherein each said battery has a bottom, sides and upper surface, comprising;

a battery box having a box body, an inner spacer member in said box body for accommodating said plurality of batteries in said box body of said battery box, wherein said inner spacer member has an upper inner spacer member for pressing and holding said upper surface of each said battery of said plurality of batteries, said upper inner spacer member having concave portions for defining predetermined spaces between said upper surface of each said battery of said plurality of batteries and said upper inner spacer member, and said inner spacer member further including partition members formed as an integral body, said partition members defining a plurality of spaced compartments for fixedly disposing each said battery of said plurality of batteries in a compartment of said plurality of spaced compartments in a condition in which each said battery is spaced and separated on all said sides of that said battery from all other said batteries of said plurality of batteries, each said compartment of said plurality of spaced compartments receiving only one said battery of said plurality of batteries in said compartment.

22. A structure for securing each battery of a plurality of batteries for driving an electric vehicle in the electric vehicle in a condition in which said plurality of batteries have been compactly disposed and wherein each said battery has sides, comprising;

a battery box having a box body, an inner spacer member in said box body for accommodating said plurality of batteries in said box body of said battery box, said inner spacer member including partition members formed as an integral body, said partition members defining a plurality of spaced compartments for fixedly disposing each said battery of said plurality of batteries in a compartment of said plurality of spaced compartments in a condition in which each said battery is spaced and separated on all said sides of that said battery from all other said batteries of said plurality of batteries, each said compartment of said plurality of spaced compartments receiving only one said battery of said plurality of batteries in said compartment, and an intake air passage member for introducing cooling air into said box body, said intake air passage member comprising a chamber in which the cooling air is received, at least one first passage for introducing external cooling air into a lower side of said chamber from an upper portion of said chamber, and a second passage provided on an upper side in said chamber and used to introduce the cooling air brought into said chamber into said body.

23. A structure according to claim 22, wherein said intake air passage member is mounted to a front end of said body, in a vehicle running direction, and discharge holes for discharging the cooling air are opened in at least one side wall of said body at a rearward location in the vehicle running direction.

24. A structure according to claim 23, wherein said intake air passage member has an impact buffering bent portion provided at a lower end of said air passage member.

25. A structure according to claim 23, wherein two said discharge holes are located in two lateral side walls of said box body.

26. A structure according to claim 23, wherein two said discharge holes are located on a rear side wall of said box body in the vehicle running direction.

27. A structure according to claim 26, wherein said intake air passage member has an impact buffering bent portion provided at a lower end of said air passage member.

28. A structure for securing each battery of a plurality of batteries for driving an electric vehicle in the electric vehicle in a condition in which said plurality of batteries have been compactly disposed and wherein each said battery has a bottom, side walls and top, comprising;

a battery box having a box body, an inner spacer member in said box body for accommodating said plurality of batteries in said box body of said battery box, said inner spacer .member further including partition members formed as an integral body, said partition members defining a plurality of spaced compartments for fixedly disposing each said battery of said plurality of batteries in a compartment of said plurality of spaced compartments in a condition in which each said battery is spaced and separated on all said sides of that said battery from all other said batteries of said plurality of batteries, each said compartment of said plurality of spaced compartments receiving only one said battery of said plurality of batteries in said compartment, and wherein said partition members of said inner spacer member include wall means extending between at least portions of adjacent said side walls of all of said plurality of batteries, said wall means including upwardly extending wall means extending vertically upward from said bottom of each said battery of said plurality of batteries and downwardly extending wall means extending vertically downward from said top of each said battery of said plurality of batteries thereby providing a cooling air space between said plurality of batteries in a vertical space between said upwardly extending wall means and said downwardly extending wall means.

29. A structure for securing each battery of a plurality of batteries for driving an electric vehicle in the electric vehicle in a condition in which said plurality of batteries have been compactly disposed and wherein each said battery has a bottom, side walls and upper surface, comprising;

a battery box having a box body, an inner spacer member in said box body for accommodating said plurality of batteries in said box body of said battery box, said inner spacer member further including partition members formed as an integral body, said partition members defining a plurality of spaced compartments for fixedly disposing each said battery of said plurality of batteries in a compartment of said plurality of spaced compartments in a condition in which each said battery is spaced and separated on all said sides of that said battery from all other said batteries of said plurality of batteries, each said compartment of said plurality of spaced compartments receiving only one said battery of said plurality of batteries in said compartment, and wherein said partition members of said inner spacer member include wall means extending between at least portions of adjacent said side walls of all of said plurality of batteries, said wall means comprising a double wall integrally connected at an extending edge with a space provided between said double wall.

* * * * *